April 12, 1960     J. R. KERSH     2,932,261
RAIL SECURING CARGO CAR
Filed March 11, 1958     2 Sheets-Sheet 1
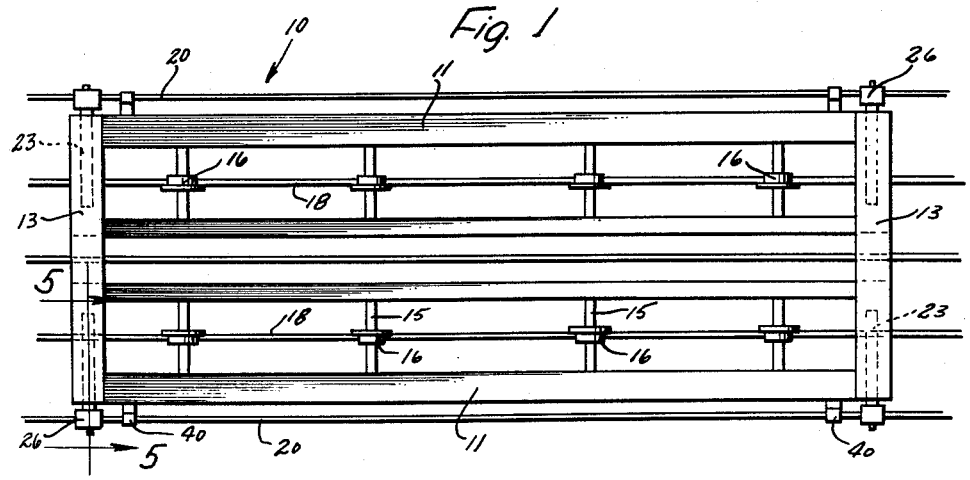
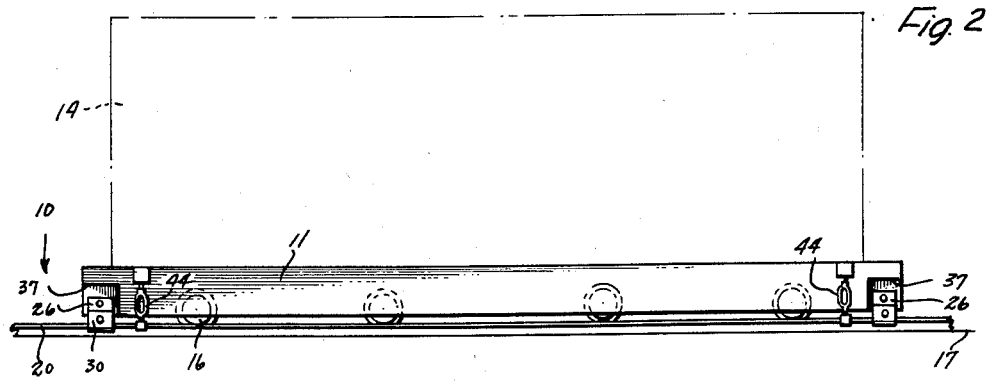
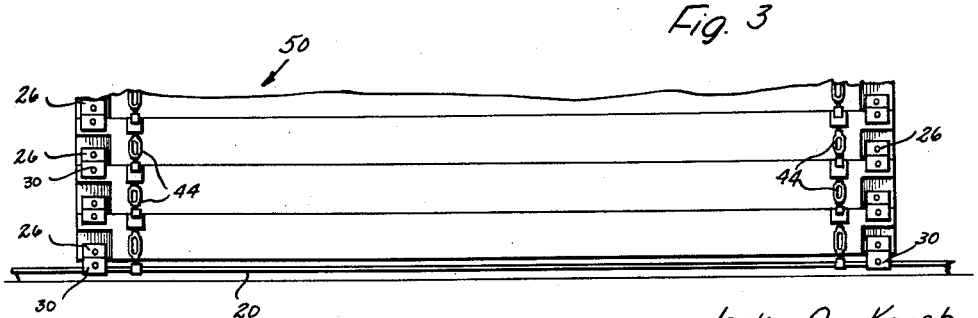
Jack R. Kersh
INVENTOR April 12, 1960  J. R. KERSH  2,932,261
RAIL SECURING CARGO CAR
Filed March 11, 1958  2 Sheets-Sheet 2
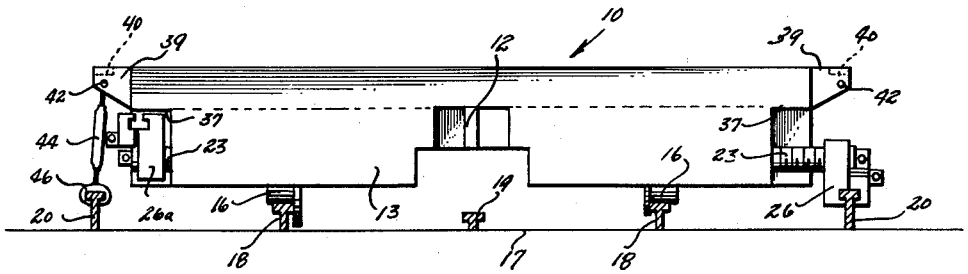
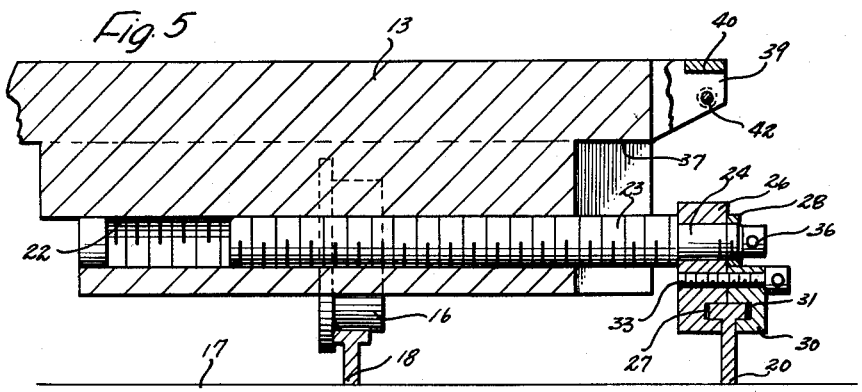
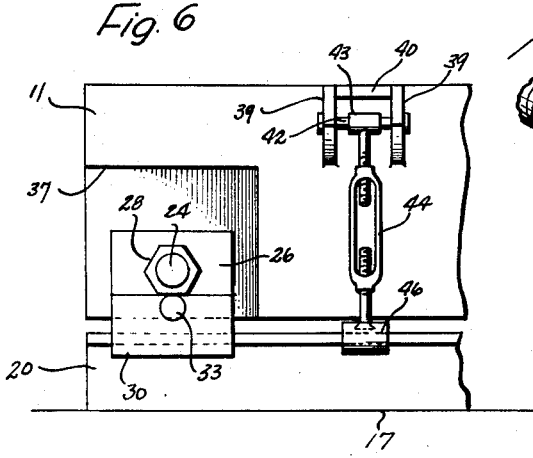
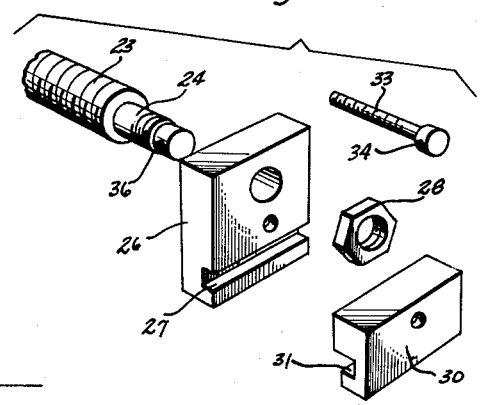
INVENTOR
Jack R. Kersh United States Patent Office 2,932,261
Patented Apr. 12, 1960

2,932,261

RAIL SECURING CARGO CAR

Jack R. Kersh, Texas City, Tex.

Application March 11, 1958, Serial No. 720,679

1 Claim. (Cl. 105—355)

This invention relates to marine transportation equipment and more particularly to a rail cargo car.

It is an object of the present invention to provide safety apparatus for securing a cargo car in a predetermined location upon a pair of running rails within the cargo hold of a ship.

Another object of the present invention is to provide retractable securing means for cargo cars that is selectively engageable with the securement rail of the railway tracks within the cargo hold of a ship for preventing accidental movement of the car during transport.

Still another object of the present invention is to provide apparatus of the above type having additional car stacking and securing means for supporting a plurality of similar cars in vertically stacked relationship for conserving storage space during the transportation of empty cargo cars.

Other objects of the invention are to provide a cargo car bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a top plan view of rail cargo car made in accordance with the present invention;

Figure 2 is a side elevational view of the car shown in Figure 1;

Figure 3 is a view similar to Figure 2, showing a plurality of empty cars stacked one upon the other;

Figure 4 is an enlarged end elevational view of the car shown in Figure 1;

Figure 5 is an enlarged fragmentary transverse cross sectional view taken along line 5—5 of Figure 1, showing certain parts of the present invention;

Figure 6 is an enlarged fragmentary side elevational view of certain other parts of the present invention; and Figure 7 is a fragmentary exploded perspective view of certain parts of the apparatus shown in Figure 5.

Referring now more in detail to the drawing, a rail cargo car 10 made in accordance with the present invention is shown to include a pair of longitudinal side stringers 11 which are rigidly connected together by means of transverse end members 13. The center sill of the car includes a tow eye 12 at each end for moving the car from place to place during the loading and use thereof. This car 10 is supported upon a pair of running rails 18 by means of axles 15 and wheels 16 rotatably supported thereon. The trackway which may be secured to the deck 17 of the cargo hold of a ship includes, in addition to the running rails 18, a securing rail 20 at the outer side of each running rail, and may further include a rabbit rail 19 therebetween. As is more clearly shown in Figures 4 and 5 of the drawing, a threaded shaft 23 is threadingly engaged within a transverse horizontal threaded bore 22 at each side of each of the transverse members 13. The outer end of each such shaft 23 is provided with a reduced portion 24 which is slidably received within a transverse bore of a rigid securing head 26. A nut 28 secures the head 26 upon the reduced portion 24, while a bolt 33 adjustably supports a securing clamp 30 to the lower portion of the securing head 26. Each of the securing head and securing clamp is provided with a horizontal inwardly facing grooves 27, 31, respectively, which defines a recess for receiving the head of a securing rail 20. Thus, by inserting a small bar into the provided transverse bore 34 of the bolt 33, the bolt may be rotated to clamp the rail head between the respective securing head 26 and clamp 30. The outer end of the threaded shaft 23 is also provided with a transverse bore 36 for receiving a bar for selectively moving the clamping assembly between the outwardly extended operative position illustrated in Figure 5 of the drawing and the inwardly disposed, inoperative position 26a shown on one side of the car illustrated in Figure 4. In the inoperative position 26a, the entire assembly is received within a recess 37 provided in the frame of the car so as to be out of the way for safety and storage purposes.

Car stacking means are also carried by each such car 10 for facilitating the stacking of a plurality of empty cars and for providing additional securing means for holding loaded cars in a stationary position. As is more clearly shown in Figures 5 and 6 of the drawing, each such means includes a pair of spaced parallel vertical lugs 39 that are integral with the longitudinal side stringers 11 of the car. A rigid bar 40 extends between each pair of lugs 39 for purposes hereinafter described. A bolt 42 extends between each pair of lugs 39 beneath the bar 40 for pivotally supporting the eye 43 of a turnbuckle 44 that has a rail grip member 46 at its lower extremity. Thus, when the empty cars are arranged in the stacked relationship shown in Figure 3 of the drawing, the rail grip 46 of the higher car is placed in securing engagement with the rigid bar 40 of the next lower car and the respective turnbuckles are tightened to provide a single rigid unit. The rail grips 46 of the lowermost car are engaged directly with the heads of the securing rails 20. Of course, when a single car is loaded with cargo 14, as shown in Figure 2, these rail grips 46 may be engaged with the securing rails 20 and the turnbuckles 44 tightened to provide additional securing engagement which will supplement the securing and holding force of the associated securing head units 26.

It will thus be recognized that a rail car has been provided having self-contained securing means for preventing accidental movement of loaded and empty rail cars within the cargo hold of a ship, which apparatus also includes self-contained means for stacking a plurality of empty cars in vertical relationship to conserve cargo space and improve the handling efficiency of the loading and unloading operations.

While various changes may be made in the detail construction, it shall be understood that such changes shall be within the spirit and scope of the present invention as defined by the appended claim.

What I claim as new and desired to protect by Letters Patent of the United States is:

A rail cargo car comprising longitudinal side stringers spaced apart from each other, transverse members spaced from each other and rigidly connected to the side stringers, each of said transverse members having in each of its ends a rail clamp storing recess and a horizontal threaded bore leading therefrom, and a rail clamp device adjustable out of and into the recess between operative and inoperative positions, each rail clamp device having a threaded shaft adjustable in the horizontal threaded bore to move the rail clamp device either out of or into the recess, a rail clamp securing head pivotally connected to and retained against inward axial displacement upon the outer end of the threaded shaft so as to be either pivoted to a raised position to be accommodated in said recess or to be lowered for engagement with one side of a rail and a cooperating outer clamp carried on said rail clamp securing head and engageable with the opposite side of the rail and a clamp screw operable between the securing head and the outer clamp for clamping the same to the rail, and means on the outer ends of the threaded shaft and the clamp screw suitable for receiving a tool by which they may be turned.

References Cited in the file of this patent

UNITED STATES PATENTS

| | | |
|---|---|---|
| 2,128,667 | Atherton | Aug. 30, 1938 |
| 2,144,410 | Ludington | Jan. 17, 1939 |
| 2,397,237 | Brolus | Mar. 26, 1946 |
| 2,693,769 | Herlehy | Nov. 9, 1954 |
| 2,781,002 | Talboys | Feb. 12, 1957 |
| 2,792,081 | Galob | May 14, 1957 |